UNITED STATES PATENT OFFICE.

MYRTIL KAHN AND ANTON OSSENBECK, OF ELBERFELD, GERMANY, ASSIGNORS TO FARBENFABRIKEN VORM. FRIEDR. BAYER & CO., OF ELBERFELD, GERMANY, A CORPORATION.

AZO DYE.

964,786.   Specification of Letters Patent.   Patented July 19, 1910.

No Drawing.   Application filed March 25, 1910.   Serial No. 551,586.

*To all whom it may concern:*

Be it known that we, MYRTIL KAHN and ANTON OSSENBECK, doctors of philosophy, chemists, citizens of the German Empire, residing at Elberfeld, Germany, have invented new and useful Improvements in New Azo Dyes, of which the following is a specification.

Our invention relates to the manufacture and production of new azo dye stuffs which dyed or printed on chrome mordants give on cotton very clear pure red shades which are valuable substitutes for alizarin red. The news dyes are moreover remarkable for their fastness to chlorin.

The process of producing these new azo dyes consists in combining the diazo-compounds of amino-benzoic acids, especially meta- and para-aminobenzoic acids, aminoanisic acid and homologues and derivatives of these compounds with acidyl-1-amino-8-naphthol sulfonic acids. The new dyes are after being dried and pulverized in the shape of their alkaline salts dark powders soluble in water with a red color and soluble in concentrated sulfuric acid with from a red to violet color. They yield upon reduction with iron and acetic acid the above mentioned aminobenzoic acids and 1-acidyl-amino-7-amino-8-naphthol sulfonic acids.

In order to illustrate the new process more fully the following example is given, the parts being by weight:—13.8 parts of meta-aminobenzoic acid are diazotized with 7 parts of sodium nitrite and hydrochloric acid and the diazocompound is introduced into a solution of 36 parts of 1-acetylamino-8-naphthol-3.6-disulfonic acid containing an excess of sodium carbonate. The mixture is stirred for several hours until the combination is complete. The dye is then salted out, filtered off and dried. It is after being dried and pulverized, in the shape of its sodium salt a dark red powder which is soluble in water with a red color and which is split up by treatment with iron and acetic acid, meta-aminobenzoic acid and 1-acetyl-amino-7-amino-8-naphthol-3.6-disulfonic acid being obtained. It produces when printed with chromium acetate on cotton pure red shades similar to alizarin red.

The process is carried out in an analogous manner on using instead of meta-aminobenzoic acid, para-aminobenzoic acid, aminoanisic acid ($C_6H_3:OCH_3:NH_2:COOH= 1:2:4$) and other phenolic ethers of the oxyaminobenzoic acid and homologues and derivatives of these compounds and instead of 1-acetylamino-8-naphthol-3.6-disulfonic acid other acidyl compounds of this acid and acidyl compounds of other 1-amino-8-naphthol sulfonic acids, such as 1-acetyl-amino-8-naphthol-4-sulfonic acid, etc.

We claim:—

1. The herein described new azo dyestuffs obtainable from the herein-specified diazotized aminobenzoic acids and 1-acidylamino-8-naphthol sulfonic acid, which dyes are after being dried and pulverized, in the shape of their alkaline salts dark powders soluble in water with a red color and soluble in concentrated sulfuric acid with from a red to violet color, yielding upon reduction with iron and acetic acid the herein-specified amino-benzoic acids and 1-acidylamino-7-amino-8-naphthol sulfonic acids and dyeing chromed cotton red shades, substantially as described.

2. The herein described new azo dyestuff obtainable from meta-aminobenzoic acid and 1-acetylamino-8-naphthol-3.6-disulfonic acid, which is in the shape of its sodium salt, after being dried and pulverized, a dark red powder soluble in water with a red color; yielding upon reduction with iron and acetic acid meta-aminobenzoic acid and 1-acetylamino-7-amino-8-naphthol-3.6-disulfonic acid; and producing when printed with chromium acetate on cotton pure red shades similar to alizarin red, substantially as described.

In testimony whereof we have hereunto set our hands in the presence of two subscribing witnesses.

MYRTIL KAHN. [L. S.]
ANTON OSSENBECK.

Witnesses:
 OTTO KÖNIG,
 CHAS. J. WRIGHT.